United States Patent
Kwon et al.

(10) Patent No.: US 12,423,057 B2
(45) Date of Patent: Sep. 23, 2025

(54) METHOD AND APPARATUS WITH DEEP LEARNING OPERATIONS WITH ADDER TREE STRUCTURE

(71) Applicant: SAMSUNG ELECTRONICS CO., LTD., Suwon-si (KR)

(72) Inventors: Hyung-Dal Kwon, Hwaseong-si (KR); Ho Young Kim, Seoul (KR); Hanmin Park, Hwaseong-si (KR); Jaehyeong Sim, Hwaseong-si (KR); Seung Wook Lee, Suwon-si (KR); Jae-Eon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1112 days.

(21) Appl. No.: 17/356,771

(22) Filed: Jun. 24, 2021

(65) Prior Publication Data
US 2022/0164164 A1    May 26, 2022

(30) Foreign Application Priority Data
Nov. 24, 2020   (KR) .................. 10-2020-0159177

(51) Int. Cl.
G06F 7/544    (2006.01)
G06F 7/50    (2006.01)

(52) U.S. Cl.
CPC ............. *G06F 7/5443* (2013.01); *G06F 7/50* (2013.01)

(58) Field of Classification Search
CPC ...... G06F 7/5443; G06F 7/50; G06F 15/8046; G06F 2207/3892; G06N 3/063
See application file for complete search history.

(56) References Cited

U.S. PATENT DOCUMENTS

| | | | | |
|---|---|---|---|---|
| 5,649,174 | A | * | 7/1997 | Dockser ................ G06F 9/3001 712/E9.017 |
| 8,218,635 | B2 | | 7/2012 | Topham |
| 9,207,908 | B1 | * | 12/2015 | Langhammer ........... G06G 7/16 |
| 10,049,082 | B2 | | 8/2018 | Ling et al. |
| 2015/0046686 | A1 | | 2/2015 | Abdallah |
| 2015/0095388 | A1 | * | 4/2015 | Vezier .............. H03K 19/17732 708/209 |

(Continued)

FOREIGN PATENT DOCUMENTS

| KR | 2003-0080958 A | 10/2003 |
|---|---|---|
| KR | 10-1578052 B1 | 12/2015 |

(Continued)

OTHER PUBLICATIONS

R. Xu, S. Ma, Y. Wang and Y. Guo, "CMSA: Configurable Multi-directional Systolic Array for Convolutional Neural Networks," 2020 IEEE 38th International Conference on Computer Design (ICCD), Hartford, CT, USA, Oct. 2020, pp. 494-497, doi: 10.1109/ICCD50377.2020.00089. (Year: 2020).*

(Continued)

*Primary Examiner* — Carlo Waje
(74) *Attorney, Agent, or Firm* — NSIP Law

(57) ABSTRACT

An apparatus with deep learning includes: a systolic adder tree including adder trees connected in row and column directions; and an input multiplexer connected to an input register of at least one of the adder trees and configured to determine column directional data movement between the adder trees based on operation modes.

20 Claims, 12 Drawing Sheets

(56) References Cited

U.S. PATENT DOCUMENTS

| | | |
|---|---|---|
| 2018/0314671 A1 | 11/2018 | Zhang et al. |
| 2018/0336164 A1 | 11/2018 | Phelps et al. |
| 2019/0114499 A1 | 4/2019 | Delaye et al. |
| 2019/0197019 A1 | 6/2019 | Patil et al. |
| 2019/0228051 A1 | 7/2019 | Langhammer et al. |
| 2019/0279083 A1* | 9/2019 | Gold .................... G06F 9/5077 |
| 2020/0050918 A1* | 2/2020 | Chen ........................ G06F 7/46 |
| 2020/0125931 A1 | 4/2020 | Judd et al. |
| 2022/0035629 A1 | 2/2022 | Kwon et al. |
| 2022/0036165 A1 | 2/2022 | Kwon |
| 2022/0043769 A1* | 2/2022 | Giannini ............ G06F 15/8046 |
| 2022/0083500 A1* | 3/2022 | Tsai ................... G06F 15/7867 |

FOREIGN PATENT DOCUMENTS

| | | |
|---|---|---|
| KR | 10-2019-0065144 A | 6/2019 |
| KR | 10-2019-0099931 A | 8/2019 |
| KR | 10-2020-0011362 A | 2/2020 |
| KR | 10-2022-0015680 A | 2/2022 |

OTHER PUBLICATIONS

Zhang, et al. "An Efficient and Reconfigurable VLSI Architecture for Different Block Matching Motion Estimation Algorithms." *1997 IEEE International Conference on Acoustics, Speech, and Signal Processing*. vol. 1. IEEE, 1997. (4 pages in English).

Huang, et al. "An Efficient and Low Power Architecture Design for Motion Estimation Using Global Elimination Algorithm." 2002 IEEE International Conference on Acoustics, Speech, and Signal Processing. Vol. 3. IEEE, 2002. (5 pages in English).

Bai, et al. "A CNN Accelerator on FPGA Using Depthwise Separable Convolution." *IEEE Transactions on Circuits and Systems II: Express Briefs* 65.10 (2018): 1415-1419. (5 pages in English).

\* cited by examiner

METHOD AND APPARATUS WITH DEEP LEARNING OPERATIONS WITH ADDER TREE STRUCTURE

CROSS-REFERENCE TO RELATED APPLICATIONS

This application claims the benefit under 35 USC § 119(a) of Korean Patent Application No. 10-2020-0159177 filed on Nov. 24, 2020, in the Korean Intellectual Property Office, the entire disclosure of which is incorporated herein by reference for all purposes.

BACKGROUND

1. Field

The following description relates to a method and apparatus with deep learning operations.

2. Description of Related Art

An adder tree structure may be used for low-power driving in an embedded neural processing unit (NPU). The adder tree structure may achieve the same performance while using about half the power compared to a systolic array. However, for an operation such as depthwise convolution, the utilization of multiplier accumulators (MACs) may drop, resulting in a sharp decrease in throughput.

However, an architecture that considers only the utilization of MACs may not support elementwise add/multiply operations and thus, may require power consumption for a relatively large area except for a depthwise operation. Accordingly, an operation device using such architecture may not efficiently reduce power consumption while perform elementwise add/multiply operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with deep learning includes: a systolic adder tree including adder trees connected in row and column directions; and an input multiplexer connected to an input register of at least one of the adder trees and configured to determine column directional data movement between the adder trees based on operation modes.

The input multiplexer may include a first multiplexer configured to determine whether to toggle the input register of the at least one adder tree.

The input multiplexer may include a second multiplexer configured to determine an input for a multiplier of the at least one adder tree.

The operation modes may include any one or any combination of a toggle mode, a variable pipeline mode, and a data feeding mode.

The first multiplexer may be configured not to toggle the input register of the at least one adder tree, in response to a variable pipeline mode of the operation modes.

The first multiplexer may be configured to transfer data stored in an input register of an adder tree in an upper row, among the adder trees, to the input register of the at least one adder tree, in response to a toggle mode of the operation modes.

The first multiplexer may be configured to transfer new data to the input register of the at least one adder tree, in response to a data feeding mode of the operation modes.

The second multiplexer may be configured to determine data stored in an input register of an adder tree in an upper row, among the adder trees, to be the input for the multiplier of the at least one adder tree, in response to a variable pipeline mode of the operation modes.

The second multiplexer may be configured to determine data stored in the input register of the at least one adder tree to be the input for the multiplier of the at least one adder tree, in response to a toggle mode of the operation modes.

The second multiplexer may be configured to determine data stored in the input register of the at least one adder tree to be the input for the multiplier of the at least one adder tree, in response to a data feeding mode of the operation modes.

The apparatus may include a control circuit configured to determine an operation mode for the input multiplexer, among the operation modes, based on either one or both of an operating frequency and an operating voltage of the apparatus.

The control circuit may be configured to determine a column directional data movement path along which data are moved in a first clock cycle of the input register of the at least one adder tree and an operation mode for the input multiplexer corresponding to the column directional data movement path.

The apparatus may include: an output register configured to store the sum of output data of adder trees included in the same row; and an output multiplexer configured to determine whether to transfer data stored in the output register to another row.

The apparatus may include: a sub-output register configured to store the sum of output data of each of sub-adder trees; and a non-linear function module configured to make data stored in the sub-output register pass through a non-linear function.

In another general aspect, a processor-implemented method with deep learning includes: receiving an operation mode and input data; controlling operations of adder trees included in a systolic adder tree based on the operation mode; and controlling an operation of an input multiplexer based on the operation mode, the input multiplexer being connected to an input register of at least one of the adder trees and being configured to determine column directional data movement between the adder trees.

The input multiplexer may include either one or both of a first multiplexer and a second multiplexer, and the controlling of the operation of the input multiplexer may include: controlling an operation of the first multiplexer based on the operation mode, the first multiplexer being configured to determine whether to toggle the input register of the at least one adder tree; and controlling an operation of the second multiplexer based on the operation mode, the second multiplexer being configured to determine an input for a multiplier of the at least one adder tree.

The controlling of the operation of the input multiplexer may include determining an operation mode for the input multiplexer based on either one or both of an operating frequency and an operating voltage of an apparatus for performing deep learning operations.

The method may include: controlling an operation of an output register configured to store the sum of output data of adder trees included in the same row; and controlling an operation of an output multiplexer configured to determine whether to transfer data stored in the output register to another row.

The method may include: controlling an operation of a sub-output register configured to store the sum of output data of each of sub-adder trees; and controlling an operation of a non-linear function module configured to make data stored in the sub-output register pass through a non-linear function.

A non-transitory computer-readable storage medium may store instructions that, when executed by a processor, configure the processor to perform the method of claim 15.

In another general aspect, an apparatus with deep learning includes: a lower multiplier accumulator (MAC) array configured to: in response to a first mode, not toggle an input register of the lower MAC array and input data stored in an input register of an upper MAC array to a multiplier of the lower MAC array; in response to a second mode, transfer the data stored in the input register of the upper MAC array to the input register of the lower MAC array and input the transferred data to the multiplier; and in response to a third mode, transfer new data to the input register of the lower MAC array and input the transferred new data to the multiplier.

In response to the first mode, the data stored in the input register of the upper MAC array may be transferred to the multiplier of the lower MAC array in a zeroth clock cycle, and in response to the second mode, the data stored in the input register of the upper MAC array may be transferred to the input register of the lower MAC array in response to a clock cycle elapsing.

The first mode, the second mode, and the third mode may respectively correspond to a variable pipeline mode, a toggle mode, and a data feeding mode.

Other features and aspects will be apparent from the following detailed description, the drawings, and the claims.

BRIEF DESCRIPTION OF THE DRAWINGS

FIG. 10 illustrates an example of a method of performing deep learning operations.

Figure 1A:
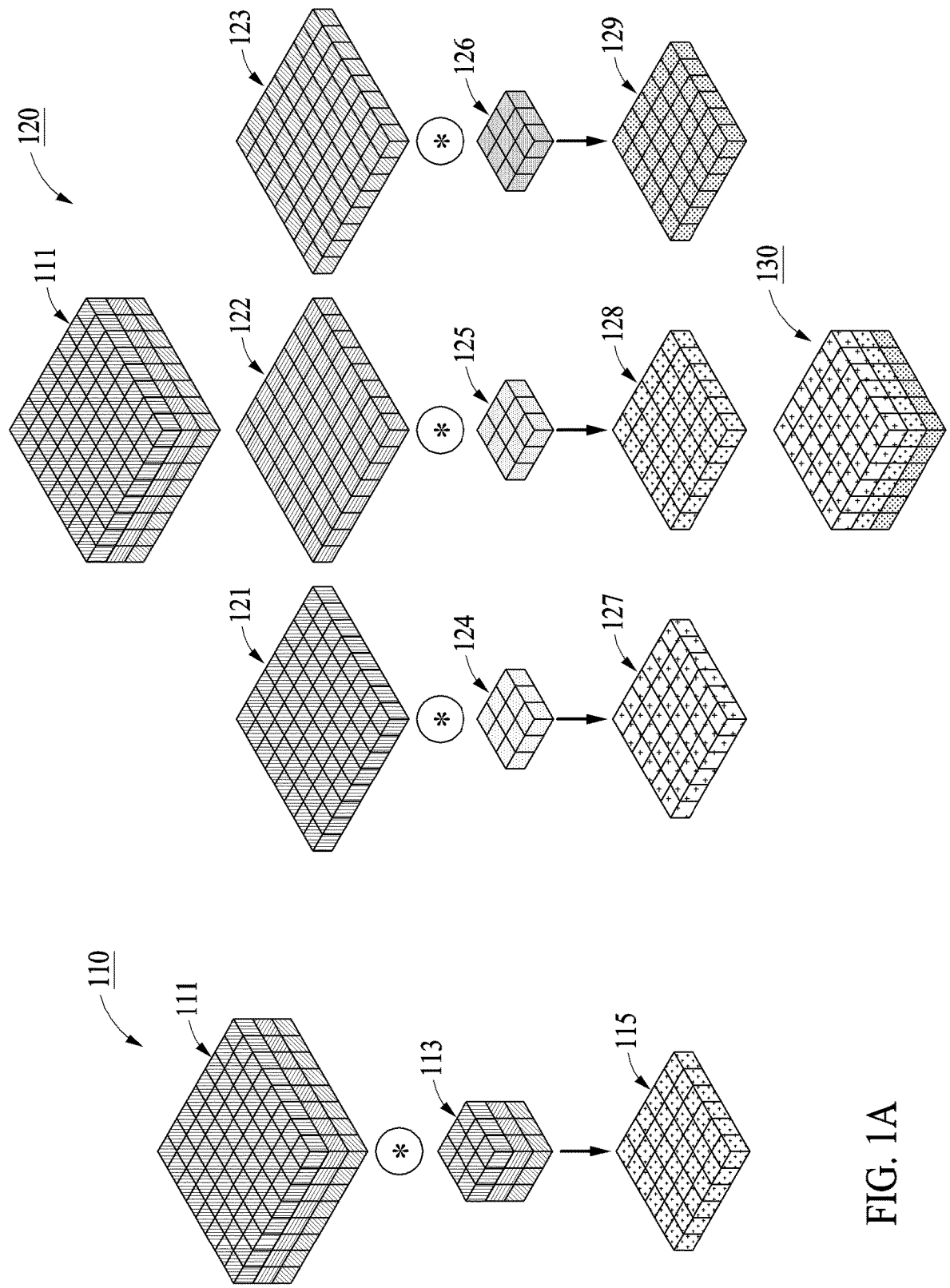
FIG. 1A illustrates an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

Figure 1B:
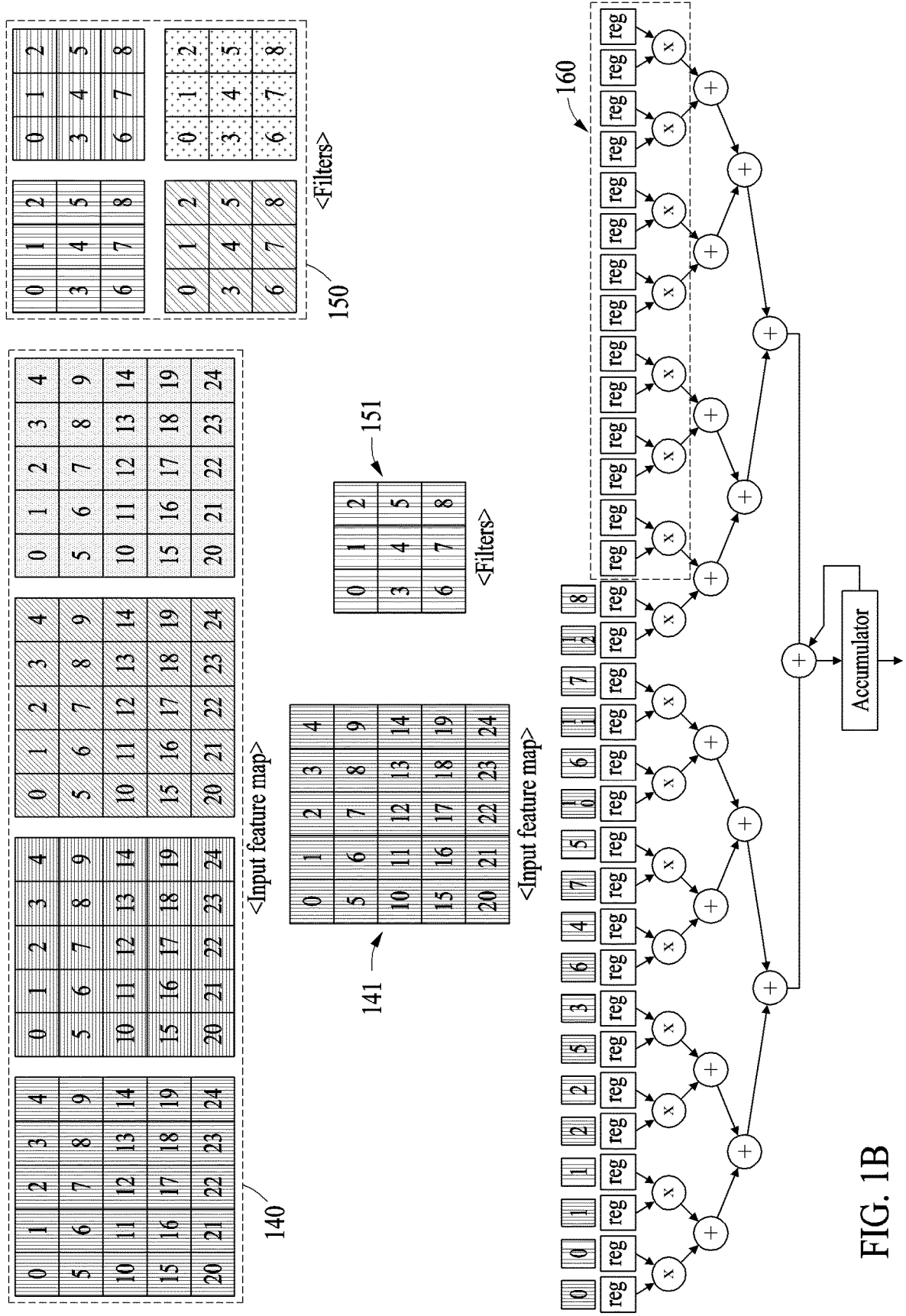
FIG. 1B illustrates an example of a method of performing deep learning operations using an adder tree structure.
Figure 1C:
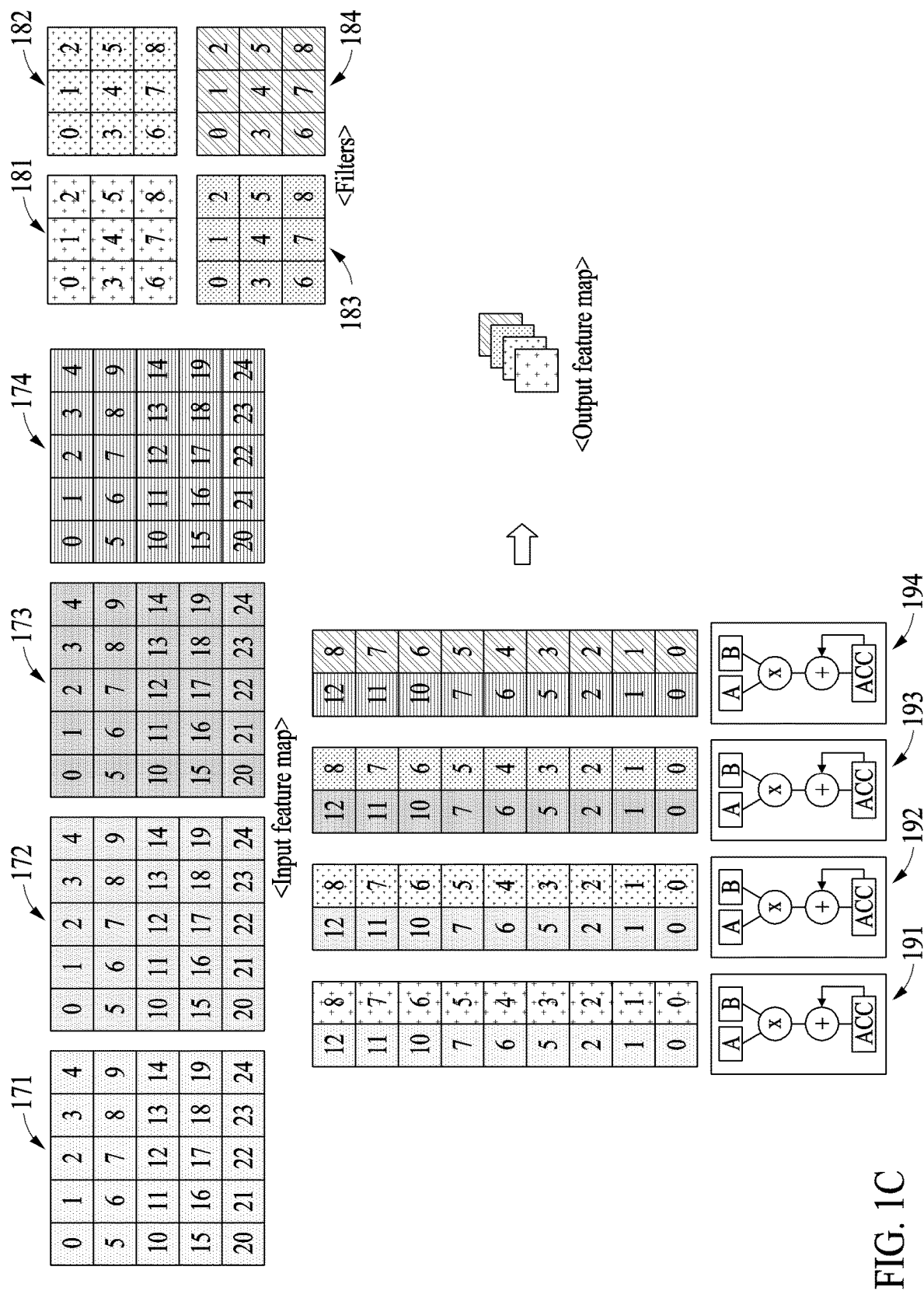
Figure 10:
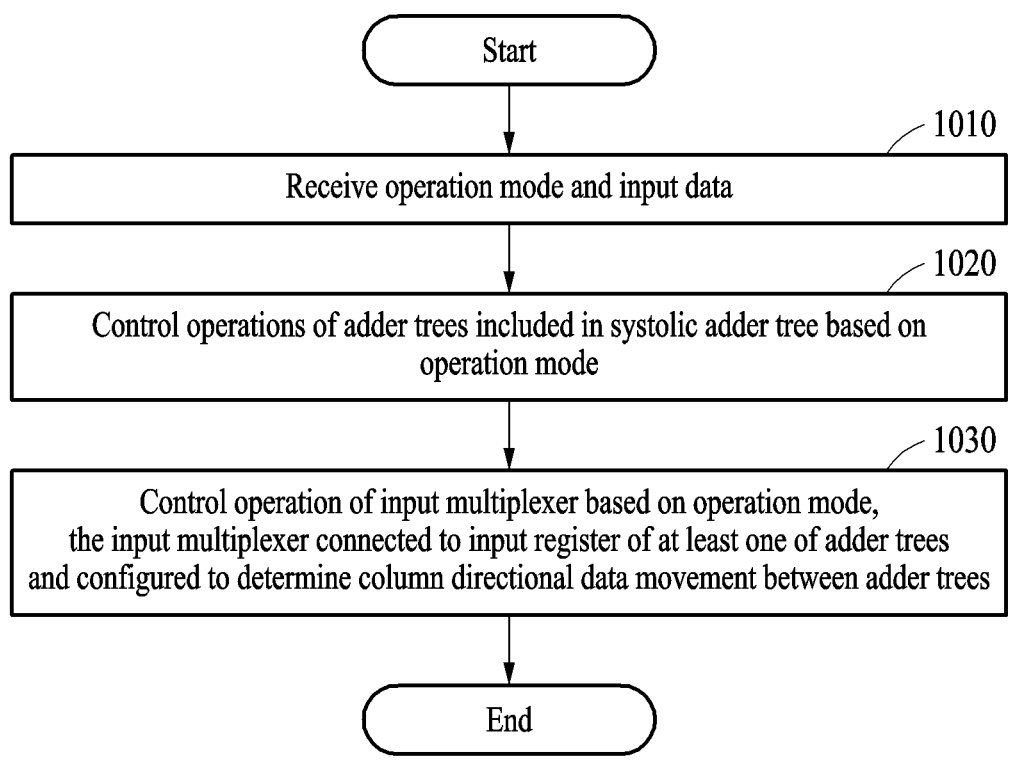
FIG. 10 illustrates an example of a method of performing deep learning operations using a single instruction multiple data (SIMD) structure including a plurality of multiplier accumulators (MACs) units.

FIG. 1A illustrates an example of a neural network, FIG. 1B illustrates an example of a method of performing deep learning operations using an adder tree structure, and FIG. 10 illustrates an example of a method of performing deep learning operations using a single instruction multiple data (SIMD) structure including a plurality of multiplier accumulators (MACs).

An artificial intelligence (AI) algorithm including the deep learning technique may input data into a neural network, train the neural network with output data through operations such as convolution, and extract features using the trained neural network. The neural network may be a computational architecture. In the neural network, nodes are connected to each other and collectively operate to process the input data. The neural network may include any one or any combination of various types of neural networks (for example, a convolutional neural network (CNN), a recurrent neural network (RNN), a deep belief network (DBN), restricted Boltzman machine (RBM) method, and/or the like). However, examples are not limited thereto. In a feed-forward neural network, nodes of the neural network have links to other nodes. Such links may extend in one direction, for example, in a forward direction, through the neural network.

Among various types of neural networks, a CNN may be used to extract features from the input data. For example, the CNN may extract visual features such as edges, lines, colors, and the like from an input image. The CNN may include a plurality of layers, and each layer may receive and process input data to generate data to be output. The data output from the layer may be a feature map generated by performing a convolution operation between an image or feature map input into the CNN and a weight of a filter. Initial layers of the CNN may extract simple features such as edges or gradients from the input, and subsequent layers of the CNN may extract progressively more complex features such as eyes, nose, and the like from the image.

Referring to FIG. 1A, a convolution operation 110 may include a process of generating a 6×6 single-channel output feature map 115 by performing a multiply and add operation between an 8×8 three-channel input feature map and a 3×3 three-channel filter 113. The size of data may be defined by (width, height) and the number of channels.

A depthwise convolution operation 120 may perform a convolution operation only within the same channel, and extract a spatial feature of each channel through this. The depthwise convolution operation 120 may include a process of generating a 6×6 three-channel output feature map 130 including output feature maps 127, 128, and 129 corresponding to respective input channels, by performing, for each input channel, a convolution operation between the 8×8 three-channel input feature map 111 (including input feature maps 121, 122, and 123) and each of three 3×3 filters 124, 125, and 126. In detail, the output feature map 127 of the first output channel may be generated by performing a multiply and add operation between the input feature map 121 of the first input channel and the first filter 124, the output feature map 128 of the second output channel may be generated by performing a multiply and add operation between an input feature map 122 of the second input channel and the second filter 125, and the output feature map 129 of the third output channel may be generated by performing a multiply and add operation between an input feature map 123 of the third input channel and the third filter 126.

Referring to FIG. 1B, an apparatus for performing deep learning operations may use an adder tree structure to be driven at low power when performing a convolution operation. The adder tree structure may include a plurality of multipliers configured to calculate the product of two items of data, adders configured to calculate the sum of outputs of two adjacent multipliers or the sum of two adjacent adders, and an accumulator configured to accumulate and add up final output data. The adder tree structure using only a small number of accumulators (e.g., a single accumulator) may perform the convolution operation with low power.

For example, the adder tree structure may perform a convolution operation between a 5×5 four-channel input feature map 140 and four 3×3 filters 150, specifically between nine items of data 0, 1, 2, 5, 6, 7, 10, 11, and 12 of an input feature map 141 of the input feature map 140 and weights 0, 1, 2, 3, 4, 5, 6, 7, and 8 of a first filter 151 of the filters 150. The multipliers of the adder tree structure may calculate products of the data of the input feature map 141 of the first input channel and the weights of the first filter 151, and the adders of the adder tree structure may accumulate and add up the output values of the multipliers, that is, 0×0, 1×1, 2×2, 5×3, 6×4, 7×5, 10×6, 11×7, and 12×8.

Since a general convolution operation accumulates and adds up output values of input feature maps of each input channel, multipliers 160 not used for the convolution operation between the input feature map 141 and the filter 151 may be used to perform a convolution operation on an input feature map of another input channel. However, the depthwise convolution operation performs a convolution operation for each input feature map of each input channel. Thus, when a depthwise convolution operation is performed using a typical adder tree structure, the multipliers 160 may not be used, resulting in a decrease in resource utilization.

In addition, since the convolution operation using the typical adder tree structure has a long data path, the apparatus for performing deep learning operations may operate at a low clock frequency. Accordingly, the typical adder tree structure may be suitable for performing general convolution operations but may not be suitable for operations for parallel processing of data such as depthwise convolution operations. Furthermore, when the typical adder tree structure is used to perform an asymmetric convolution operation with an asymmetric filter such as a 7×1, 1×7, 3×1, or 1×3 filter, the resource utilization efficiency may also decrease.

Referring to FIG. 10, an apparatus for performing deep learning operations may perform a depthwise convolution operation using a SIMD structure including a plurality of MACs.

The SIMD structure may include a plurality of processing elements (PEs) 191, 192, 193, and 194 configured to perform the same operation, and many operations may be performed simultaneously by inputting data into each of the PEs. Each PE of the SIMD structure may be configured as a MAC to perform an operation of ACC=ACC+(A×B).

In the SIMD structure, each MAC includes an accumulator. Thus, the SIMD structure may be suitable for performing a depthwise convolution operation of performing a convolution operation for each channel. For example, each PE 191, 192, 193, 194 of the SIMD structure may perform a depthwise convolution operation between a 5×5 four-channel input feature map 171, 172, 173, 174 and a 3×3 filter 181, 182, 183, 184. In detail, the PE 191 may perform a convolution operation between the input feature map 171 and the filter 181, the PE 192 may perform a convolution operation between the input feature map 172 and the filter 182, the PE 193 may perform a convolution operation between the input feature map 173 and the filter 183, and the PE 194 may perform a convolution operation between the input feature map 174 and the filter 184. In addition, the SIMD structure may have a short data path for operation and thus, operate at a high clock frequency.

However, a typical SIMD structure may require an accumulator for every MAC and thus, may have great power consumption. For example, a single accumulator may be sufficient to perform a general convolution operation using the adder tree structure. However, when performing a general convolution operation using the SIMD structure, all accumulators of the typical SIMD structure may operate, resulting in a decrease in power efficiency. Accordingly, the typical SIMD structure may be suitable for operations for parallel processing of data such as depthwise convolution operations, but may not be suitable for performing general convolution operations.

As described above, the typical adder tree structure may be suitable for performing general convolution operations, but may not be suitable for asymmetric convolution operations using asymmetric filters and operations for parallel processing of data such as depthwise convolution operations, and conversely, the typical SIMD structure may be suitable for operations for parallel processing of data such as depthwise convolution operations, but may not be suitable for performing general convolution operations.

As will be described below, the apparatus for performing deep learning operations of one or more embodiments may have a smaller area and better power efficiency than the typical SIMD structure as not including an accumulator for each array, like the adder tree structure, and may reduce the memory read/write power compared to the typical adder tree structure as transferring and sharing input data in the column direction, unlike the typical adder tree structure.

Figure 2:
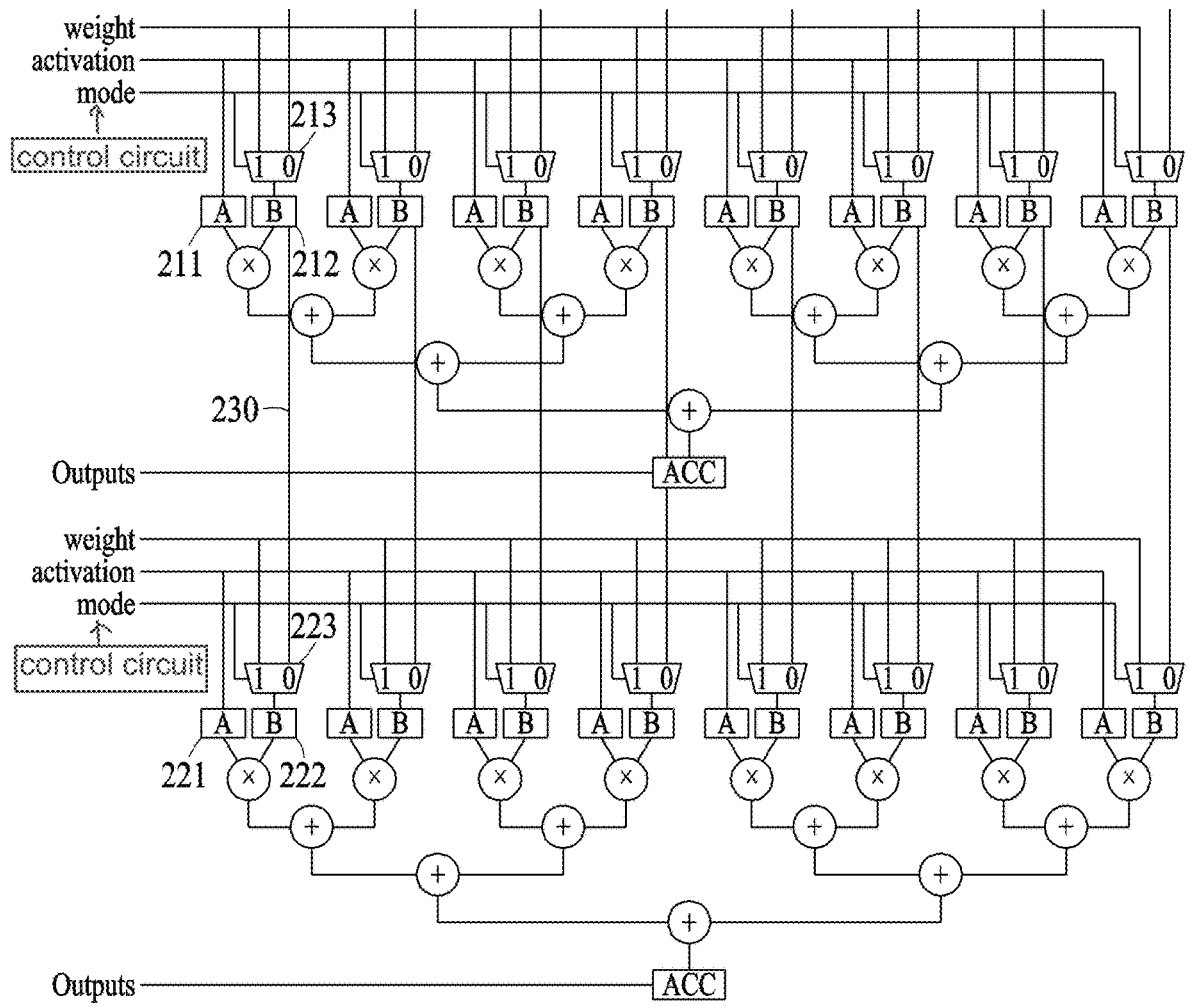
FIG. 2 illustrates an example of a circuit diagram of an apparatus for performing deep learning operations.

FIG. 2 illustrates an example of a circuit diagram of an apparatus for performing deep learning operations.

Referring to FIG. 2, an apparatus for performing deep learning operations may include a systolic adder tree including adder trees that are connected in row and column directions. In the example of FIG. 2, the systolic adder tree may include two rows (e.g., an upper row and a lower row) each including eight input register pairs, and a weight and an activation may be input to each input register pair.

The apparatus for performing deep learning operations may further include an input multiplexer connected to an input register of at least one of the adder trees and configured to determine column directional data movement between the adder trees based on operation modes. In the example of FIG. 2, the apparatus for performing deep learning operations may include an input multiplexer 213 or 223 connected to an input register (e.g., an input register 212 or 222 where a weight is stored) of one of the eight input register pairs (e.g., (211, 212) or (221, 222)) and configured to determine column directional data movement between the adder trees based on operation modes determined by a control circuit.

The apparatus for performing deep learning operations may transfer data stored in an input register of the adder tree in the upper row to an input register of the adder tree in the lower row through the input multiplexer.

For example, in response to a control signal "0" being input, the input multiplexer 223 of the adder tree in the lower row may transfer data stored in the input register 212 of the adder tree in the upper row to the input register 222 in the lower row through a data path 230. Conversely, in response to a control signal "1" being input, the input multiplexer 223 of the adder tree in the lower row may receive new weight data other than the data stored in the input register 212 of the adder tree in the upper row.

The apparatus for performing deep learning operations of one or more embodiments may input different activations and weights to the input register pairs, respectively, thereby having higher resource use efficiency than an adder tree mode. However, there is a limitation in that the apparatus for performing deep learning operations of FIG. 2 may receive only the data from the immediately upper row.

Figure 3:
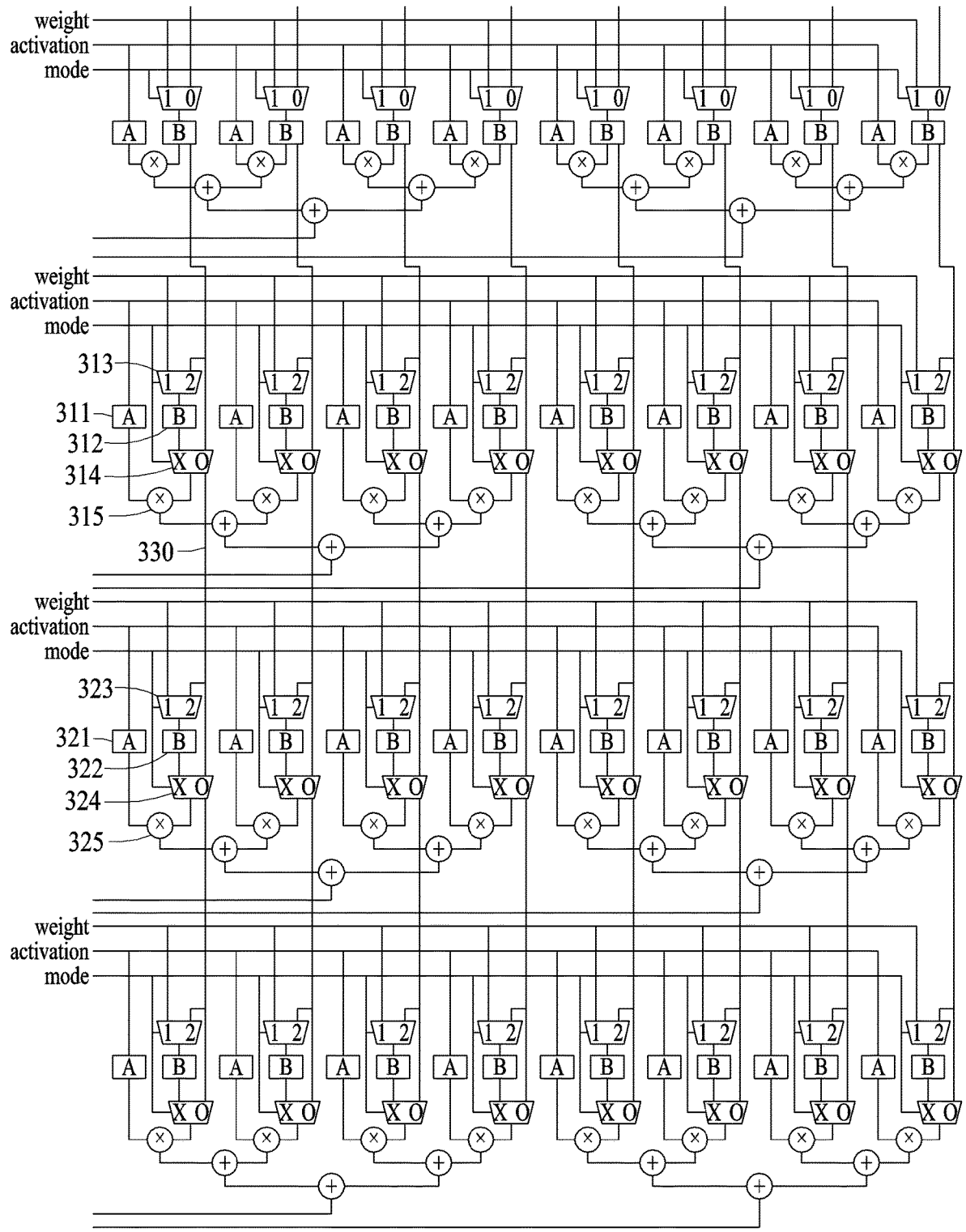
FIG. 3 illustrates an example of a circuit diagram of an apparatus for performing deep learning operations.

FIG. 3 illustrates an example of a circuit diagram of an apparatus for performing deep learning operations.

Referring to FIG. 3, an apparatus for performing deep learning operations may include a systolic adder tree including adder trees that are connected in row and column directions. In the example of FIG. 3, the systolic adder tree may include four rows each including eight input register pairs, and a weight and an activation may be input to each input register pair.

The apparatus for performing deep learning operations may further include an input multiplexer connected to an input register of at least one of the adder trees and configured to determine column directional data movement between the adder trees based on operation modes. In the example of FIG. 3, the apparatus for performing deep learning operations may include input multiplexers 313 and 314 or 323 and 324 connected to an input register (e.g., an input register 312 or 322 where a weight is stored) of one of the eight input register pairs (e.g., (311, 312) or (321, 322)) and configured to determine column directional data movement between the adder trees based on operation modes.

In detail, the apparatus for performing deep learning operations may include a first multiplexer configured to determine whether to toggle the input register of the adder tree, and a second multiplexer configured to determine an input for a multiplier of the adder tree. For example, the apparatus for performing deep learning operations may include a first multiplexer 313 or 323 configured to determine whether to toggle the input register 312 or 322 of the adder tree, and a second multiplexer 314 or 324 configured to determine an input for a multiplier 315 or 325 of the adder tree.

The apparatus for performing deep learning operations may be implemented to select one of the operation modes, and the operation modes may include a toggle mode, a variable pipeline mode, and/or a data feeding mode. For example, the apparatus for performing deep learning operations may operate in the variable pipeline mode when a control signal "0" is input, operate in the data feeding mode when a control signal "1" is input, and operate in the toggle mode when a control signal "2" is input.

The first multiplexer 323 may not toggle the input register 322 of the adder tree in response to the variable pipeline mode (e.g., when the control signal "0" is input). The first multiplexer 323 may transfer data stored in the input register 312 of the adder tree in the upper row through a data path 330 to the input register 322 of the adder tree in response to the toggle mode (e.g., when the control signal "2" is input). The first multiplexer 323 may transfer new data to the input register 322 of the adder tree in response to the data feeding mode (e.g., when the control signal "1" is input).

The second multiplexer 324 may determine the data stored in the input register 312 of the adder tree in the upper row to be an input for the multiplier 325 of the adder tree in response to the variable pipeline mode (e.g., when the control signal "0" is input). The second multiplexer 324 may determine the data stored in the input register 322 of the adder tree to be an input for the multiplier 325 of the adder tree in response to the toggle mode (e.g., when the control signal "2" is input). The second multiplexer 324 may determine the data stored in the input register 322 of the adder tree to be an input for the multiplier 325 of the adder tree in response to the data feeding mode (e.g., when the control signal "1" is input), like the toggle mode.

As described above, in the variable pipeline mode, the apparatus for performing deep learning operations may transfer data to the multiplier using the input multiplexer, rather than toggling the input register. Through this, the apparatus for performing deep learning operations may receive the data from the immediately upper row and the data from a row as far as allowed by a clock period of the input register of the adder tree.

A multiplexer may consume much lesser power than a register (e.g., an 8-bit flip-flop consumes 7 times more power than an 8-bit multiplexer). Thus, the apparatus for performing deep learning operations of one or more embodiments of FIG. 3 may have better power efficiency than the apparatus for performing deep learning operations of FIG. 2. Hereinafter, an operating method of the apparatus for performing deep learning operations according to the toggle mode, the variable pipeline mode, and/or the data feeding mode will be described with reference to FIG. 4.

Figure 4:
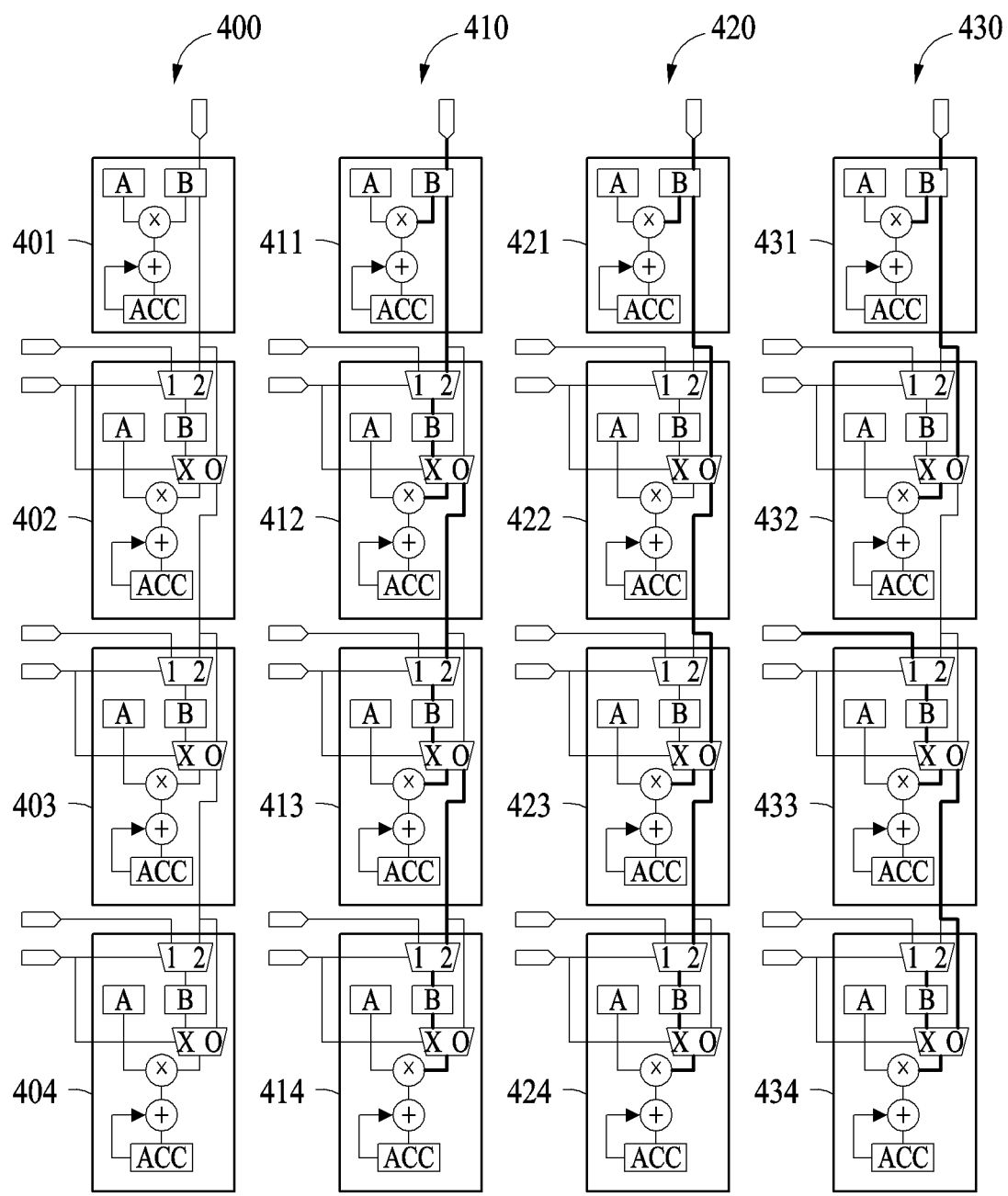
FIG. 4 illustrates an example of an operating method of an apparatus for performing deep learning operations according to operation modes.

FIG. 4 illustrates an example of an operating method of an apparatus for performing deep learning operations according to operation modes.

Referring to FIG. 4, an apparatus 400 for performing deep learning operations may be include a plurality of MAC arrays such as MAC arrays 401, 402, 403, and 404 disposed in four rows. The MAC arrays 401, 402, 403, and 404 may correspond to the rows of the apparatus for performing deep learning operations of FIG. 3. For example, the MAC array 402 may correspond to an upper row and the MAC array 403 may correspond to a lower row. Similarly, the MAC arrays 411, 412, 413, and 414 may correspond to the rows of the apparatus of FIG. 3, the MAC arrays 421, 422, 423, and 424 may correspond to the rows of the apparatus of FIG. 3, the MAC arrays 431, 432, 433, and 434 may correspond to the rows of the apparatus of FIG. 3, in non-limiting examples.

The apparatus 400 may control column directional data movements between adder trees using input multiplexers. For example, the multiplexers may be disposed in the respective adder trees or in only a portion of the adder trees. When the multiplexers are disposed only in a portion of the adder trees, a predetermined multiplexer may control the adder trees together.

An apparatus 410 for performing deep learning operations shows an example in which MAC arrays 412, 413, and 414 all operate in a toggle mode (e.g., when a control signal "2" is input). When the MAC arrays 412, 413, and 414 all operate in the toggle mode, data stored in an input register of a MAC array 411 may be transferred to the MAC array 412 when a first clock cycle elapses, transferred to the MAC array 413 when a second clock cycle elapses, and transferred to the MAC array 414 when a third clock cycle elapses. The apparatus 410 may be used for applications that operate using a high operating frequency, and that have high power consumption since all the input registers are toggled.

An apparatus 420 for performing deep learning operations shows an example in which MAC arrays 422 and 423 operate in a variable pipeline mode (e.g., when a control signal "0" is input) and a MAC array 424 operates in a toggle mode (e.g., a control signal "2" is input). When the MAC arrays 422 and 423 operate in the variable pipeline mode, data stored in an input register of a MAC array 421 may be transferred to the MAC arrays 422 and 423 in a zeroth clock cycle. Further, when the MAC array 424 operates in the toggle mode, the data stored in the input register of the MAC array 421 may be transferred to the MAC array 424 when the first clock cycle 1 elapses. As a result, both the input registers of the MAC arrays 422 and 423 are not toggled, and thus the power consumption may be reduced.

An apparatus 430 for performing deep learning operations shows an example in which MAC arrays 432 and 434 operate in a variable pipeline mode (e.g., when a control signal "0" is input) and a MAC array 433 operates in a data feeding mode (e.g., a control signal "1" is input). When the MAC array 432 operates in the variable pipeline mode, data stored in an input register of a MAC array 431 may be transferred to the MAC array 432 in the zeroth clock cycle. Further, when the MAC array 433 operates in the data feeding mode, new data different from the data stored in the input register of the MAC array 431 may be transferred to the MAC array 433. Thereafter, since the MAC array 434 operates in the variable pipeline mode, the data stored in an input register of the MAC array 433 may be transferred to the MAC array 434 in a zeroth clock cycle.

As described above, the apparatus 400 of one or more embodiments may effectively reduce the overall power consumption by adjusting the operation modes and voltages applied to the MAC arrays.

Figure 5:
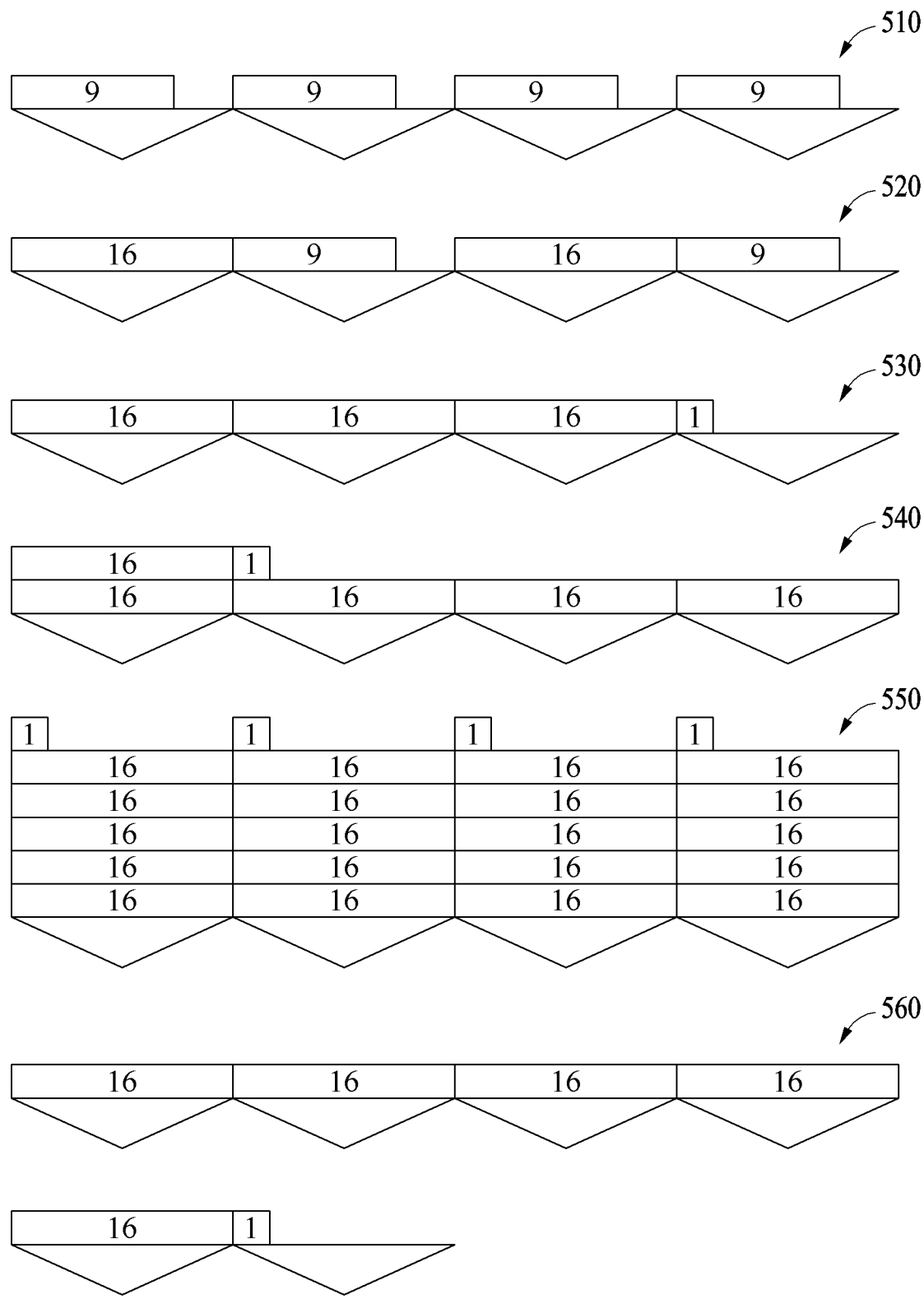
FIG. 5 illustrates examples of arranging input data.

FIG. 5 illustrates examples of arranging input data.

Referring to FIG. 5, in a depthwise convolution operation, filter data (e.g., weights) may be disposed as shown in examples 510 to 560 to reduce memory read power.

When the filter size is smaller than the horizontal length of a MAC array, there is no need to read out the filter data from the memory, if storing the filter data as in the examples 510 to 530 during an operation of each channel of a single activation, since a single filter is provided for each channel in a depthwise convolution operation.

When the filter size is greater than the horizontal length of a MAC array, the memory read power may be reduced if processing as in the examples 540 and 550 by increasing the capacity of a resistor such that the filter data are stored in rows, without needing to read out the filter data from the memory. In the example 540, when the horizontal length of a MAC array is 64, a 9×9 filter may be operated in a second clock cycle. Here, since the length of data processed in the second clock cycle is shorter than the MAC array, registers not in operation may reduce the power consumption through clock gating.

Further, when processing a large filter such as a 9×9 filter, by storing data in rows of adder trees as in the example 560, the filter may be processed without changing the value of a register.

Figure 6:
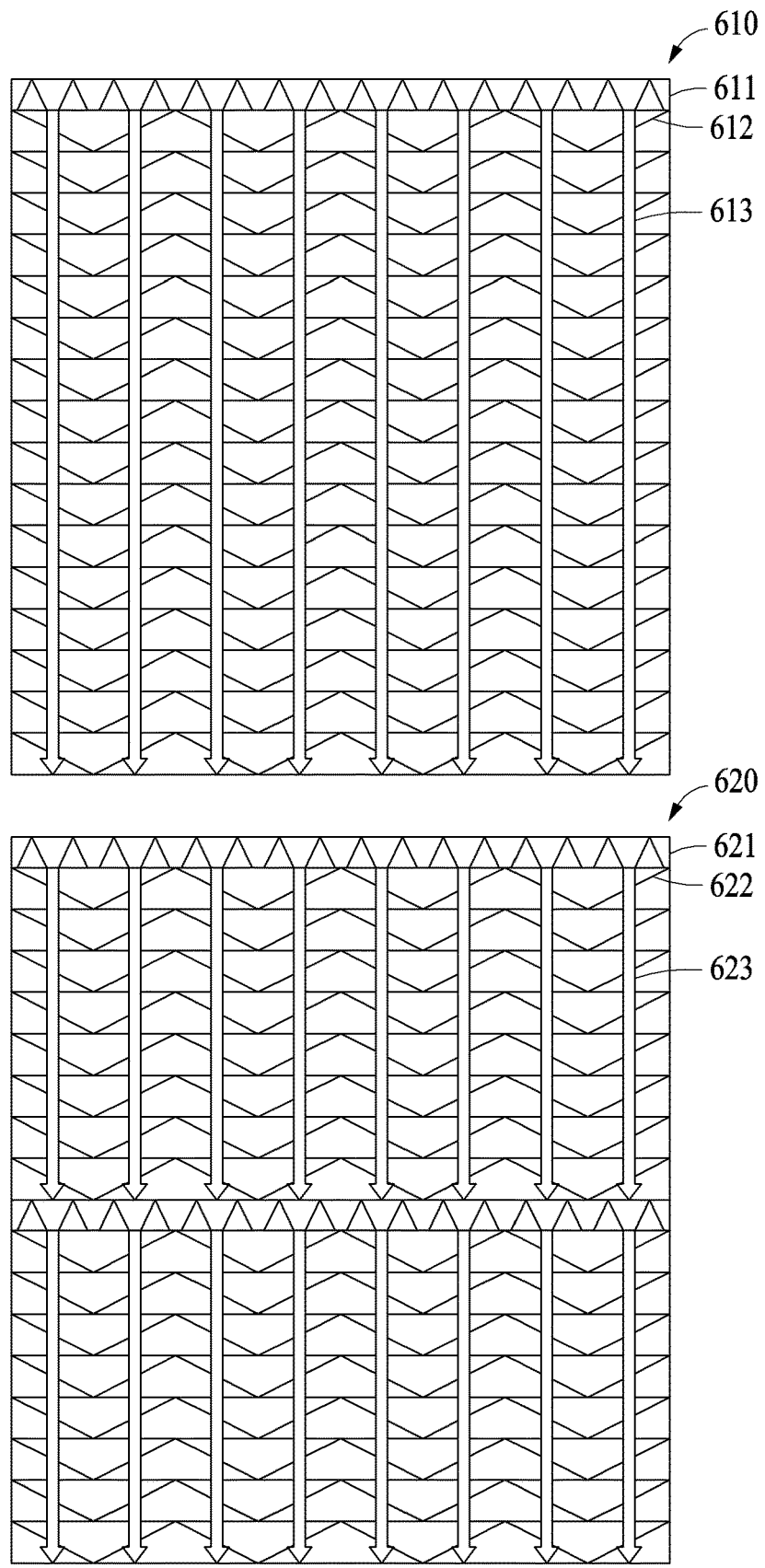
FIG. 6 illustrates an example of synthesizing a multiplier accumulator (MAC) array.

FIG. 6 illustrates an example of synthesizing a multiplier accumulator (MAC) array.

Referring to FIG. 6, a MAC array synthesis method may derive optimal performance and power efficiency by adjusting a pipeline stage. The pipeline stage may refer to an input register row used for a two-dimensional (2D) MAC array. A synthesized 2D MAC array 610 may include an input register 611 and an adder tree 612, and a synthesized 2D MAC array 620 may include an input register 621 and an adder tree 622. A pipeline stage of the synthesized 2D MAC array 610 may be 1, and a pipeline stage of the synthesized 2D MAC array 620 may be 2.

Since a data path 613 along which data may move in a first clock cycle in the synthesized 2D MAC array 610 is longer than a data path 623 along which data may move in a first clock cycle in the synthesized 2D MAC array 620, the synthesized 2D MAC array 610 may be more suitable for a case of a relatively low operating frequency than the synthesized 2D MAC array 620. The synthesized 2D MAC array 610 may require a large area and heavy power consumption as having a longer data path along which data may move in a first clock cycle than the synthesized 2D MAC array 620.

According to the MAC array synthesis method of one or more embodiments, by synthesizing MAC arrays by adjusting the pipeline based on an operating frequency of an application to be used, the area may be minimized, and the power efficiency may be maximized. According to the MAC array synthesis method of one or more embodiments, a pipeline may be inserted such that an input register may frequently take signals in the middle if an operating frequency of an application is relatively high.

For example, a MAC array may be synthesized such that an input register may be least used at the operating frequency of the application. Alternatively, a MAC array may set the lowest operating voltage to be applied thereto within the range in which an adder tree normally operates at the operating frequency, thereby reducing the power consumption.

Table 1 below shows an example of pipeline stages according to operating frequencies and operating voltages.

TABLE 1

|          | 0.71 V | 0.61 V | 0.51 V | 0.41 V |
|----------|--------|--------|--------|--------|
| 500 MHz  | 2      | 2      | 4      | 8      |
| 600 MHz  | 2      | 4      | 4      | 8      |
| 700 MHz  | 4      | 4      | 8      | 16     |
| 800 MHz  | 4      | 4      | 8      | 16     |
| 900 MHz  | 4      | 8      | 16     | 32     |
| 1000 MHz | 8      | 16     | 32     | X      |

An apparatus for performing deep learning operations may store pipeline stages according to operating frequencies and operating voltages as shown in Table 1 and utilize the pipeline stages for dynamic voltage and frequency scaling (DVFS). In detail, the apparatus for performing deep learning operations may include a control circuit (e.g. the control circuit of FIG. 2), and the control circuit may determine an operation mode for an input multiplexer based on at least one of an operating frequency and an operating voltage of the apparatus for performing deep learning operations.

Figure 7:
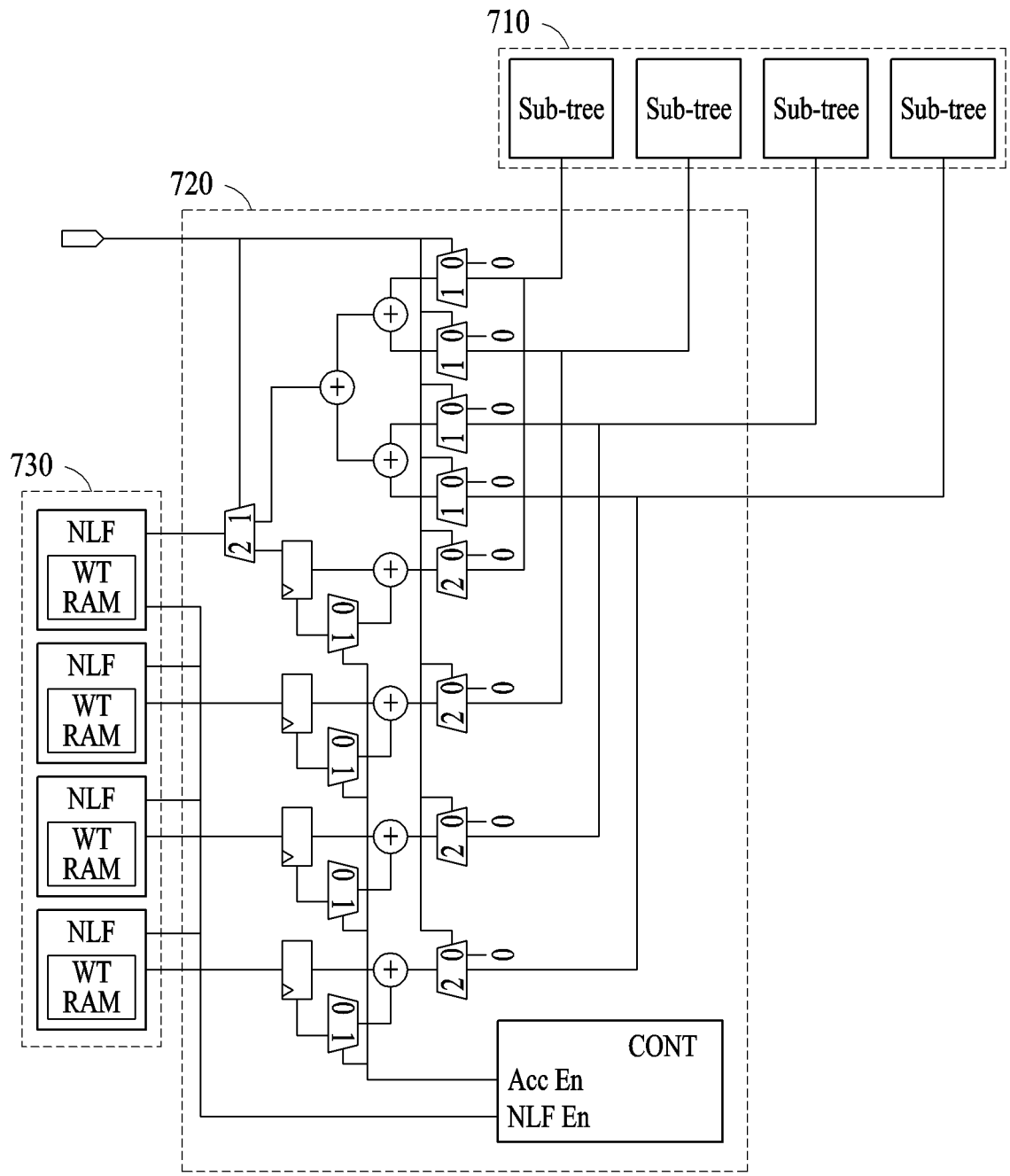
FIG. 7 illustrates an example of performing a non-linear function operation by a deep learning operation apparatus.

FIG. 7 illustrates an example of performing a non-linear function operation by a deep learning operation apparatus.

Referring to FIG. 7, a deep learning operation apparatus may divide an adder tree in each row into N sub-trees and perform a different operation on each sub-tree.

For example, the deep learning operation apparatus may divide an adder tree 710 (e.g., a 64-adder tree) in each row into 4 sub-trees (e.g., 16-adder trees). In this example, four pieces of output data may be output by processing the output separately for each 16-adder tree when performing a 3×3 depthwise convolution operation, two pieces of output data may be output by processing the output for each group of 32-adder trees when performing a 5×5 depthwise convolution operation, and a single piece of output data may be output by adding up the output of the entire 64-adder tree to be a single value for the other case (e.g., when performing a general convolution operation).

To this end, the deep learning operation apparatus may include an accumulation module 720 including sub-output registers that accumulate the outputs of the N sub-trees, and a non-linear function module 730 that receives the outputs of the N sub-trees and performs a non-linear function (NLF) (e.g., ReLU, Sigmoid, Tanh, Leaky ReLU, swich, or SeLU). In the past, a non-linear function was performed by a central processing unit (CPU) rather than a neural processing unit (NPU). However, since the deep learning operation apparatus includes the non-linear function module 730, the non-linear function may be directly processed at the NPU end without a timing loss.

Figure 8:
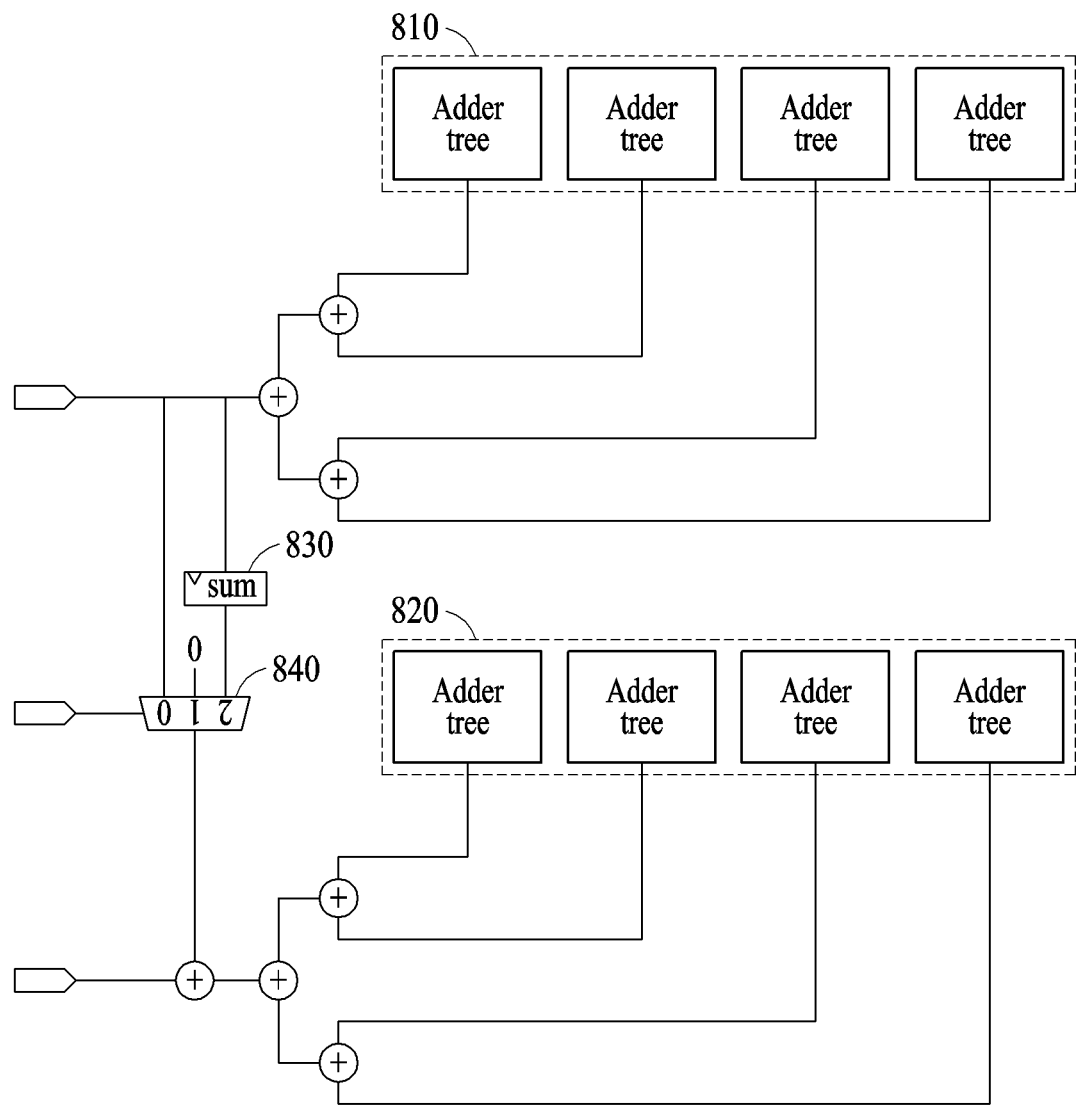
FIG. 8 illustrates an example of adding up output data by transferring output data from one row to another row.

FIG. 8 illustrates an example of adding up output data by transferring output data from one row to another row.

Referring to FIG. 8, a deep learning operation apparatus may include an output register 830 configured to store the sum of output data of adder trees included in a first row 810, and an output multiplexer 840 configured to determine whether to transfer data stored in the output register 830 to a second row 820.

The deep learning operation apparatus may transfer the sum of the output data of the adder trees in the first row 810 to the second row 820, thereby reducing the number of writes to a memory. For example, when a 2×2 convolution operation is to be performed, by storing four pieces of filter data in input registers in respective rows and inserting activations into respective corresponding rows, it is possible to perform the operation without a partial sum (e.g., when the channel depth is less than or equal to the horizontal length of the adder tree) or while minimizing the partial sum.

Since the power consumption for reading from/writing to the memory is generally much greater than the power consumption of the register, multiplexer, and adder, the deep learning operation apparatus may reduce the power consumption.

Figure 9:
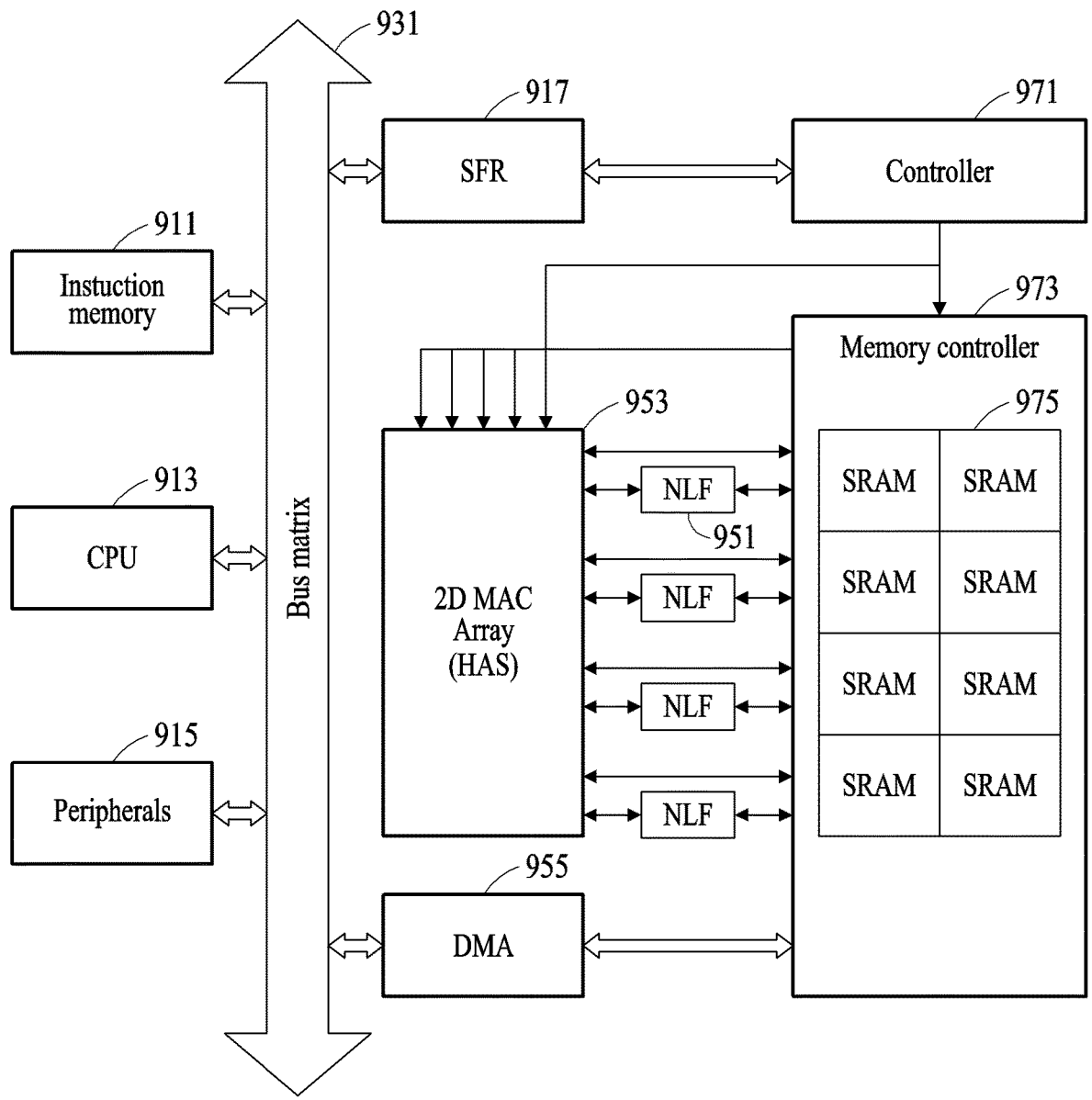
FIG. 9 illustrates an example of hardware implementation of an apparatus for performing deep learning operations.

FIG. 9 illustrates an example of hardware implementation of an apparatus for performing deep learning operations.

Referring to FIG. 9, an apparatus for performing deep learning operations may include an instruction memory 911, a central processing unit (CPU) 913, peripherals 915, and a special function register (SFR) 917.

The apparatus for performing deep learning operations may further include a non-linear function (NLF) 951, a MAC array 953, a direct memory access (DMA) 955, and a controller 971.

The apparatus for performing deep learning operations may further include a memory controller 973 including a plurality of static random-access memories (SRAMs) 975.

The instruction memory 911, the CPU 913, the peripherals 915, the SFR 917, and the DMA 955 in the apparatus for performing deep learning operations may communicate with each other through a bus matrix 931.

FIG. 10 illustrates an example of a method of performing deep learning operations.

Referring to FIG. 10, operations 1010 to 1030 may be performed by the apparatus for performing deep learning operations described with reference to FIGS. 1A to 9. The apparatus for performing deep learning operations may be implemented by one or more hardware modules, one or more software modules, or various combinations thereof.

In operation 1010, the apparatus for performing deep learning operations receives an operation mode and input data.

In operation 1020, the apparatus for performing deep learning operations may control operations of adder trees included in a systolic adder tree based on the operation mode.

In operation 1030, the apparatus for performing deep learning operations may control an operation of an input multiplexer based on the operation mode, the input multiplexer connected to an input register of at least one of the adder trees and configured to determine column directional data movement between the adder trees.

The input multiplexer may include at least one of a first multiplexer and a second multiplexer, and the apparatus for performing deep learning operations may control an operation of the first multiplexer based on the operation mode and control an operation of the second multiplexer based on the operation mode. Here, the first multiplexer may be configured to determine whether to toggle the input register of the at least one adder tree, and the second multiplexer may be configured to determine an input for a multiplier of the at least one adder tree.

The apparatus for performing deep learning operations may determine an operation mode for the input multiplexer based on at least one of an operating frequency and an operating voltage of the apparatus for performing deep learning operations.

The apparatus for performing deep learning operations may control an operation of an output register configured to store the sum of output data of adder trees included in the same row, and control an operation of an output multiplexer configured to determine whether to transfer data stored in the output register to another row.

The apparatus for performing deep learning operations may control an operation of a sub-output register configured to store the sum of output data of each of sub-adder trees, and control an operation of a non-linear function module configured to make data stored in the sub-output register pass through a non-linear function.

The multipliers, PEs, input registers, input multiplexers, data paths, multipliers, apparatuses, MAC arrays, synthesized 2D MAC arrays, input registers, adder trees, data paths, accumulation modules, non-linear function modules, first rows, second rows, output registers, output multiplexers, instruction memories, CPUs, peripherals, SFRs, NLFs, DMAs, controllers, memory controllers, SRAMs, multipliers 160, PEs 191, 192, 193, and 194, input registers 211, 212, 221, and 222, input multiplexers 213 and 223, data path 230, input registers 311, 312, 321, and 322, input multiplexers 313, 314, 323, and 324, multipliers 315 and 325, data path 330, apparatus 400, MAC arrays 401, 402, 403, and 404, apparatus 410, MAC arrays 411, 412, 413, and 414, apparatus 420, MAC arrays 421, 422, 423, and 424, apparatus 430, MAC arrays 431, 432, 433, and 434, synthesized 2D MAC array 610, input register 611, adder tree 612, data path 613, synthesized 2D MAC array 620, input register 621, adder tree 622, data path 623, adder tree 710, accumulation module 720, non-linear function module 730, first row 810, second row 820, output register 830, output multiplexer 840, instruction memory 911, CPU 913, peripherals 915, SFR 917, NLF 951, MAC array 953, DMA 955, controller 971, memory controller 973, SRAMs 975, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD–ROMs, CD–Rs, CD+Rs, CD–RWs, CD+RWs, DVD–ROMs, DVD–Rs, DVD+Rs, DVD–RWs, DVD+RWs, DVD–RAMs, BD–ROMs, BD–Rs, BD–R LTHs, BD–REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus with deep learning, the apparatus comprising:
   a systolic adder tree including adder trees connected in row and column directions;
   an input multiplexer connected to an input register of at least one of the adder trees and configured to determine column directional data movement between the adder trees based on operation modes; and
   a control circuit configured to determine an operation mode for the input multiplexer, among the operation modes, based on either one or both of an operating frequency and an operating voltage of the apparatus.

2. The apparatus of claim 1, wherein the input multiplexer comprises a first multiplexer configured to determine whether to toggle the input register of the at least one adder tree.

3. The apparatus of claim 1, wherein the input multiplexer comprises a second multiplexer configured to determine an input for a multiplier of the at least one adder tree.

4. The apparatus of claim 1, wherein the operation modes comprise any one or any combination of a toggle mode, a variable pipeline mode, and a data feeding mode.

5. The apparatus of claim 2, wherein the first multiplexer is configured not to toggle the input register of the at least one adder tree, in response to a variable pipeline mode of the operation modes.

6. The apparatus of claim 2, wherein the first multiplexer is configured to transfer data stored in an input register of an adder tree in an upper row, among the adder trees, to the input register of the at least one adder tree, in response to a toggle mode of the operation modes.

7. The apparatus of claim 2, wherein the first multiplexer is configured to transfer new data to the input register of the at least one adder tree, in response to a data feeding mode of the operation modes.

8. The apparatus of claim 3, wherein the second multiplexer is configured to determine data stored in an input register of an adder tree in an upper row, among the adder trees, to be the input for the multiplier of the at least one adder tree, in response to a variable pipeline mode of the operation modes.

9. The apparatus of claim 3, wherein the second multiplexer is configured to determine data stored in the input register of the at least one adder tree to be the input for the multiplier of the at least one adder tree, in response to a toggle mode of the operation modes.

10. The apparatus of claim 3, wherein the second multiplexer is configured to determine data stored in the input register of the at least one adder tree to be the input for the multiplier of the at least one adder tree, in response to a data feeding mode of the operation modes.

11. The apparatus of claim 1, wherein the control circuit is configured to determine a column directional data movement path along which data are moved in a first clock cycle of the input register of the at least one adder tree and an operation mode for the input multiplexer corresponding to the column directional data movement path.

12. The apparatus of claim 1, further comprising:
an output register configured to store a sum of output data of adder trees included in the same row; and
an output multiplexer configured to determine whether to transfer data stored in the output register to another row.

13. The apparatus of claim 1, further comprising:
a sub-output register configured to store a sum of output data of each of sub-adder trees; and
a processor configured to apply a non-linear function to the stored sum.

14. A processor-implemented method with deep learning, the method comprising:
receiving an operation mode and input data;
controlling operations of adder trees included in a systolic adder tree based on the operation mode; and
controlling an operation of an input multiplexer based on the operation mode, the input multiplexer being connected to an input register of at least one of the adder trees and being configured to determine column directional data movement between the adder trees,
wherein the controlling of the operation of the input multiplexer comprises determining the operation mode for the input multiplexer based on either one or both of an operating frequency and an operating voltage of an apparatus for performing deep learning operations.

15. The method of claim 14, wherein
the controlling of the operation of the input multiplexer comprises at least one of:
controlling an operation of a first multiplexer of the input multiplexer based on the operation mode, the first multiplexer being configured to determine whether to toggle the input register of the at least one adder tree; or
controlling an operation of a second multiplexer of the input multiplexer based on the operation mode, the second multiplexer being configured to determine an input for a multiplier of the at least one adder tree.

16. The method of claim 14, further comprising:
controlling an operation of an output register configured to store a sum of output data of adder trees included in the same row; and
controlling an operation of an output multiplexer configured to determine whether to transfer data stored in the output register to another row.

17. The method of claim 14, further comprising:
controlling an operation of a sub-output register configured to store a sum of output data of each of sub-adder trees, and an applying of a non-linear function to the stored sum.

18. A non-transitory computer-readable storage medium storing instructions that, when executed by a processor, configure the processor to perform the method of claim 14.

19. An apparatus with deep learning, the apparatus comprising:
a lower multiplier accumulator (MAC) array configured to, at least with respect to different first, second, and third modes:
in response to the first mode, not toggle an input register of the lower MAC array and input data stored in an input register of an upper MAC array to a multiplier of the lower MAC array;
in response to the second mode, transfer the data stored in the input register of the upper MAC array to the input register of the lower MAC array and input the transferred data to the multiplier; and
in response to the third mode, transfer new data to the input register of the lower MAC array and input the transferred new data to the multiplier,
wherein in response to the first mode, the data stored in the input register of the upper MAC array is transferred to the multiplier of the lower MAC array in a zeroth clock cycle, and
in response to the second mode, the data stored in the input register of the upper MAC array is transferred to the input register of the lower MAC array in response to a clock cycle elapsing.

20. The apparatus of claim 19, wherein the first mode, the second mode, and the third mode respectively correspond to a variable pipeline mode, a toggle mode, and a data feeding mode.

* * * * *